United States Patent
Croak et al.

(10) Patent No.: US 8,588,216 B2
(45) Date of Patent: *Nov. 19, 2013

(54) METHOD AND APPARATUS FOR BLOCKING A PAY-PER-USE FEATURE IN A COMMUNICATIONS NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/048,794

(22) Filed: Mar. 15, 2011

(65) Prior Publication Data

US 2011/0164612 A1    Jul. 7, 2011

Related U.S. Application Data

(63) Continuation of application No. 11/262,881, filed on Oct. 31, 2005, now Pat. No. 7,912,039.

(51) Int. Cl.
*H04L 12/66* (2006.01)

(52) U.S. Cl.
USPC ........................................ 370/352; 379/201.1

(58) Field of Classification Search
USPC .............. 370/352; 379/196–198, 200, 201.01
See application file for complete search history.

(56) References Cited

U.S. PATENT DOCUMENTS

| | | | |
|---|---|---|---|
| 5,651,059 A | 7/1997 | Morgan et al. | |
| 5,734,710 A | 3/1998 | Hirth et al. | |
| 6,498,791 B2 | 12/2002 | Pickett et al. | |
| 6,587,553 B1 | 7/2003 | Shaffer et al. | |
| 6,795,540 B1 | 9/2004 | Mow | |
| 7,069,291 B2* | 6/2006 | Graves et al. ................ | 709/201 |
| 7,155,001 B2* | 12/2006 | Tiliks et al. .................. | 379/196 |
| 7,912,039 B1 | 3/2011 | Croak et al. | |
| 2002/0167946 A1 | 11/2002 | Gallant | |
| 2002/0168060 A1 | 11/2002 | Huie | |
| 2004/0023636 A1 | 2/2004 | Gurel | |
| 2004/0029564 A1 | 2/2004 | Hodge | |
| 2006/0003735 A1 | 1/2006 | Trandal et al. | |
| 2006/0280165 A1 | 12/2006 | Blumenschein et al. | |
| 2008/0226048 A1 | 9/2008 | Creamer et al. | |

* cited by examiner

Primary Examiner — William Deane, Jr.

(57) ABSTRACT

A method and apparatus for blocking at least one pay-per-use feature in a communications network is described. In one embodiment, a request to initiate at least one pay-per-use feature from at least one endpoint device associated with a subscriber is received. A determination of whether a blocking function has been activated for the at least one pay-per-use feature is then made. Afterwards, the request to initiate the at least one pay-per-use feature is blocked if the blocking function is activated.

20 Claims, 4 Drawing Sheets

METHOD AND APPARATUS FOR BLOCKING A PAY-PER-USE FEATURE IN A COMMUNICATIONS NETWORK

This application is a continuation of U.S. Ser. No. 11/262,881, filed Oct. 31, 2005, now U.S. Pat. No. 7,912,039, and is herein incorporated by reference in its entirety.

BACKGROUND OF THE INVENTION

1. Field of the Invention

Embodiments of the present invention generally relate to telecommunications systems and, more particularly, to a method and apparatus for blocking a pay-per-use feature in a communications network, such as a packet network, e.g., a Voice over Internet protocol (VoIP) network.

2. Description of the Related Art

The Internet has emerged as a critical communication infrastructure, carrying traffic for a wide range of important scientific, business and consumer applications. Internet services are becoming ubiquitous and customers are combining both voice and data services on a single Internet based infrastructure such as a packet network e.g., a Voice over Internet Protocol (VoIP) network. VoIP service providers offer their customers an increasing array of enhanced services beyond the basic telephony service. These services are innovative and give the users more control over their telephony services.

Users of VoIP network services, however, often share a common household with other people who can access these services via endpoint devices (e.g., traditional phones) that are connected to the network through terminal adaptors and broadband modems. For various reasons, the primary subscriber may wish to control access to various telephony services, especially those that are characterized by high usage charges, such as pay-per-use call features Thus, there is a need in the art for a method and apparatus for blocking pay-per-use features.

SUMMARY OF THE INVENTION

In one embodiment, a method and apparatus for blocking at least one pay-per-use feature in a communications network is described. Specifically, a request to initiate at least one pay-per-use feature from at least one endpoint device associated with a subscriber is received. A determination of whether a blocking function has been activated for the at least one pay-per-use feature is then made. Afterwards, the request to initiate the at least one pay-per-use feature is blocked if the blocking function is activated.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
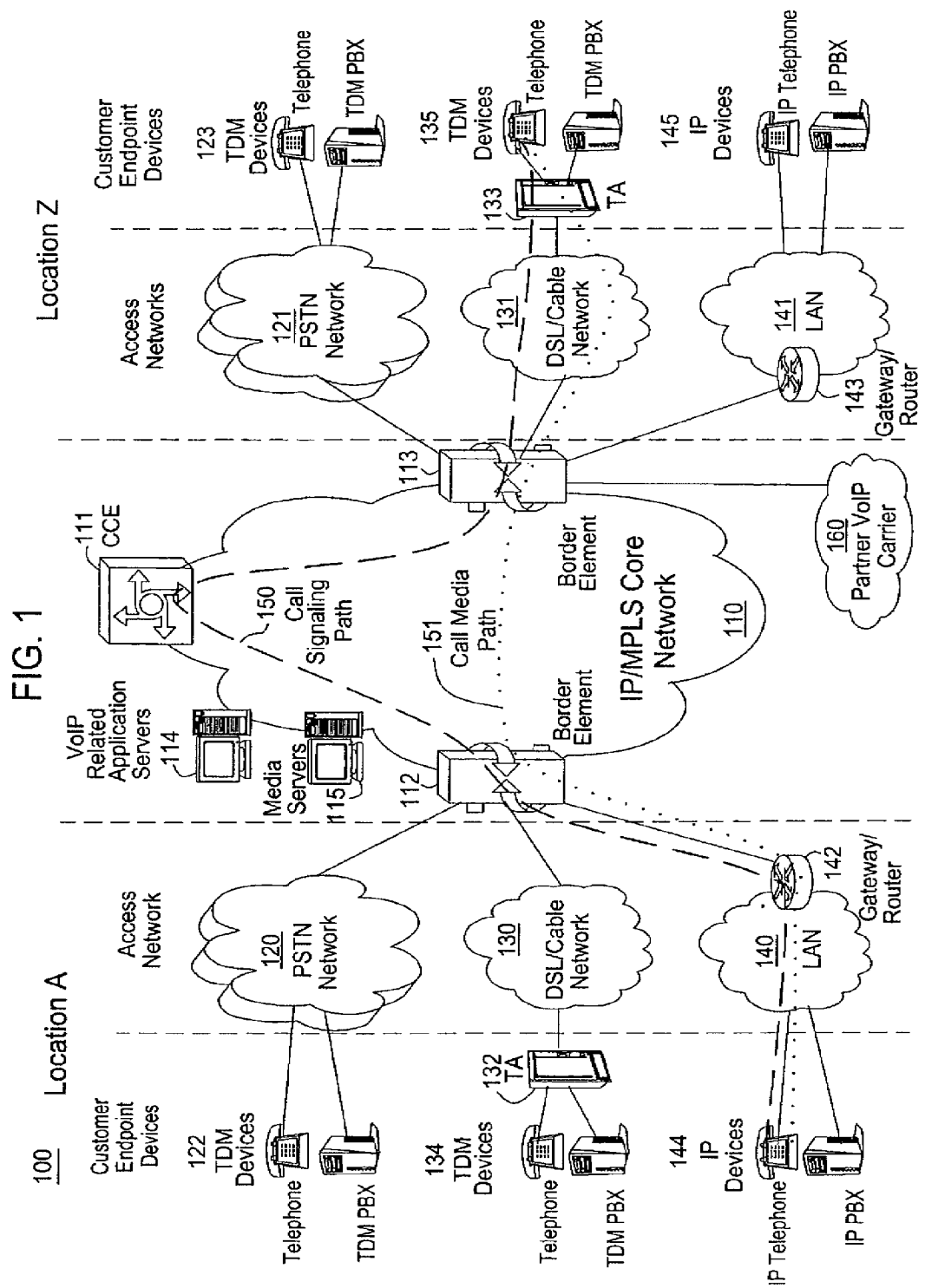
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
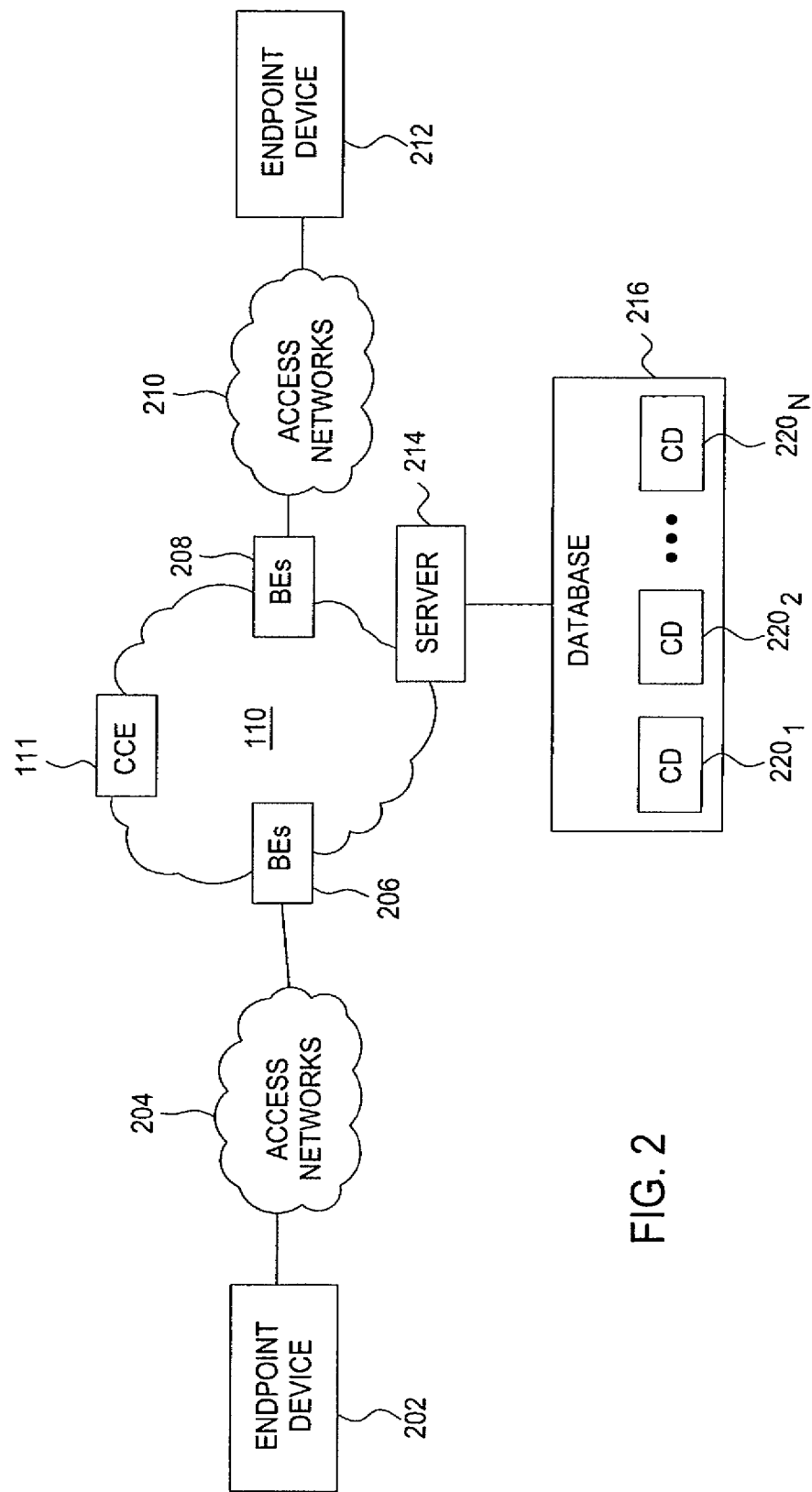
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and one or more border elements (BEs) 206. An endpoint device 212 is configured for communication with the core network 110 via an access network 210 and one or more BEs 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc.).

The core network 110 also includes a server 214 in communication with a database 216. In one embodiment of the present invention, the server 214 is configured to receive several different types of blocking commands from a subscriber of network services. Specifically, the server 214 is capable of receiving an instruction to block requests for pay-per-use features from a subscriber. A pay-per-use feature may be any call service feature that when request by a subscriber causes the subscriber's account to incur a charge. A pay-per-use feature may include, but is not limited to, an international long distance call to a designated country, a locate me function, a call tracing function, a three-way calling function, a call to a 1-900 number, or a call waiting disablement function.

In one scenario, the subscriber may wish to block calls that originate from the subscriber's home (or other endpoint devices, calling cards, and the like that are associated with the subscriber's account) and are directed to international destinations on a per country basis. Depending on the embodiment, the subscriber may utilize a user interface associated with a dedicated web portal, a voice menu driven interface associated with an automated service, a service call to a customer care center, and the like, to designate the subscriber's desired pay-per-use blocking requests.

After the subscriber has designated these pay-per-use blocking preferences, the server 214 responds by storing this customer data $220_{1...n}$ into the database 216 as prohibited pay-per-use feature information (on a per subscriber account basis). The server 214 saves the customer data $220_{1...n}$ to be used for future call monitoring. For example, in the event that someone in the subscriber's household attempts to call a number located in a prohibited country (as designated by the subscriber in the prohibited pay-per-use data), the server 214 will already be configured to detect the prohibited call, e.g., by recognizing the international code or area code of the destination number. The server 214 then takes the appropriate measures, such as instructing a particular BE to not complete the call connection, to comply with the subscriber's request. Thus, any attempt to use the subscriber's endpoint device to subscribe to a pay-per-use feature is detected and blocked by the server 214. If by choice the subscriber ever decides to call a previously prohibited country or to use any other prohibited pay-per-use feature is required, the present invention is equipped to allow the subscriber to override any or all of the previously designated blocking features. Typically, the server 214 will require proper authentication, which may be accomplished by the subscriber via the submission of a personal identification number (PIN) on a web portal (or voice menu on the phone) or by contacting a customer care agent at a call center. Once provided with the proper authentication, the server 214 will modify the customer data 220$_{1...n}$ accordingly.

Figure 3:
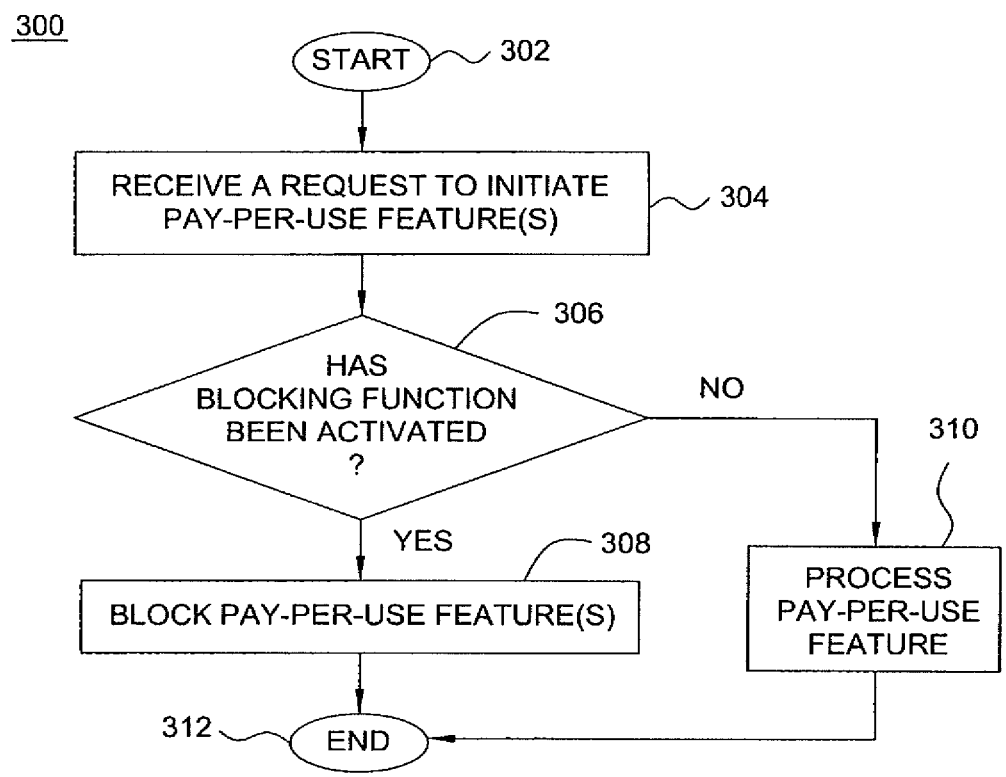
FIG. 3 is a flow diagram depicting an exemplary embodiment of a method for blocking a pay-per-use feature in a communications network in accordance with one or more aspects of the invention.

FIG. 3 is a flow diagram depicting an exemplary embodiment of a method 300 for blocking a pay-per-use feature in a communications network as related to one or more aspects of the invention. The method 300 begins at step 302 and proceeds to step 304 where a request to initiate at least one pay-per-use feature from at least one endpoint device associated with a subscriber.

At step 306, a determination is made as to whether a blocking function has been activated for the at least one pay-per-use feature. In one embodiment, a server 214 determines whether a subscriber activated a blocking feature that would prevent the use of at least one pay-per-use feature on the subscriber's endpoint device or other related telephony mechanisms associated with the subscriber's account (e.g., a calling card). If the blocking function has been activated for the at least one pay-per-use feature, then the method 300 proceeds to step 308. At step 308, the at least one pay-per-use feature is blocked. In one embodiment, the server 214 detects the request of the prohibited pay-per-use feature and consequently implements an appropriate function to block the request to initiate the at least one pay-per-use feature. The method 300 then ends at step 312.

If the blocking function was found to have not been activated in step 306, then the method 300 proceeds to step 310. At step 310, the at least one pay-per-use feature is processed normally. In one embodiment, the server 214 does not recognize the at least one pay-per-use feature as a prohibited pay-per-use feature (as designated by the subscriber) and therefore, permits the subscriber's endpoint device to utilize the requested pay-per-use feature. The method 300 then ends at step 312.

Figure 4:
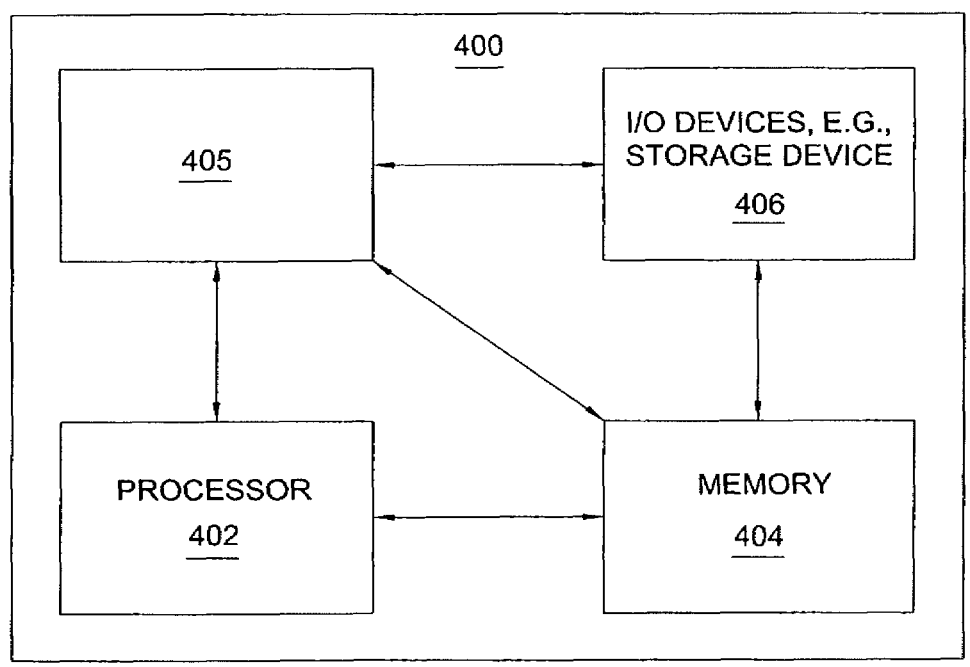
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for blocking a pay-per-use feature, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for blocking a pay-per-use feature can be loaded into memory 404 and executed by processor 402 to implement the functions as discussed above. As such, the present process 405 for blocking a pay-per-use feature (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for blocking a pay-per-use feature in a communications network, comprising:
    receiving, via a processor, a request to initiate the pay-per-use feature from an endpoint device associated with a subscriber;
    determining, via the processor, whether a blocking function has been activated for the pay-per-use feature;
    determining, via the processor, whether the blocking function has been overridden by the subscriber; and
    blocking, via the processor, the request to initiate the pay-per-use feature if the blocking function is activated and has not been overridden by the subscriber, wherein the blocking function is activated by a predefined instruction from the subscriber to selectively block the pay-per-use feature associated with the endpoint device.

2. The method of claim 1, wherein the communications network comprises an internet protocol network.

3. The method of claim 2, wherein the internet protocol network comprises voice over Internet protocol network.

4. The method of claim 1, wherein the blocking function is activated by the subscriber via a web portal.

5. The method of claim 1, wherein the activation of the blocking function is provided by the subscriber via a voice menu.

6. The method of claim 1, wherein the pay-per-use feature comprises a locate me function.

7. The method of claim 1, wherein the pay-per-use feature comprises a call tracing function.

8. The method of claim 1, wherein the pay-per-use feature comprises a three-way calling function.

9. The method of claim 1, wherein the pay-per-use feature comprises a call waiting disablement function.

10. An apparatus for blocking a pay-per-use feature in a communications network, comprising:
    a processor; and
    a non-transitory computer-readable medium storing a plurality of instructions which, when executed by the processor, cause the processor to perform operations, the operations comprising:
        receiving a request to initiate the pay-per-use feature from an endpoint device associated with a subscriber;
        determining whether a blocking function has been activated for the pay-per-use feature;
        determining whether the blocking function has been overridden by the subscriber; and
        blocking the request to initiate the pay-per-use feature if the blocking function is activated and has not been overridden by the subscriber, wherein the blocking function is activated by a predefined instruction from the subscriber to selectively block the pay-per-use feature associated with the endpoint device.

11. The apparatus of claim 10, wherein the communications network comprises an internet protocol network.

12. The apparatus of claim 10, wherein the blocking function is activated by the subscriber via a web portal.

13. The apparatus of claim 10, wherein the activation of the blocking function is provided by the subscriber via a voice menu.

14. The apparatus of claim 10, wherein the pay-per-use feature comprises a locate me function.

15. The apparatus of claim 10, wherein the pay-per-use feature comprises a call tracing function.

16. The apparatus of claim 10, wherein the pay-per-use feature comprises a three-way calling function.

17. The apparatus of claim 10, wherein the pay-per-use feature comprises a call waiting disablement function.

18. A non-transitory computer-readable medium storing a plurality of instructions which, when executed by a processor, causes the processor to perform operations for blocking a pay-per-use feature in a communications network, the operations comprising:
   receiving a request to initiate the pay-per-use feature from an endpoint device associated with a subscriber;
   determining whether a blocking function has been activated for the pay-per-use feature;
   determining whether the blocking function has been overridden by the subscriber; and
   blocking the request to initiate the pay-per-use feature if the blocking function is activated and has not been overridden by the subscriber, wherein the blocking function is activated by a predefined instruction from the subscriber to selectively block the pay-per-use feature associated with the endpoint device.

19. The non-transitory computer-readable medium of claim 18, wherein the blocking function is activated by the subscriber via a web portal.

20. The non-transitory computer readable medium of claim 18, wherein the activation of the blocking function is provided by the subscriber via a voice menu.

* * * * *